Figure 7:
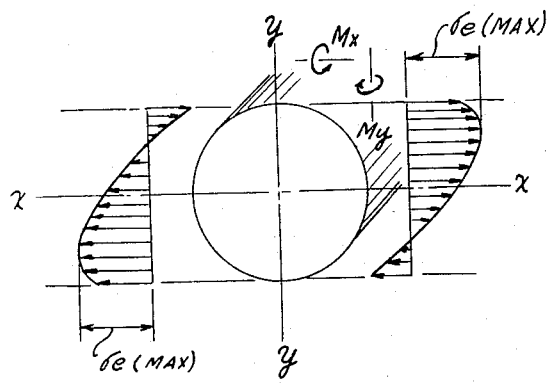

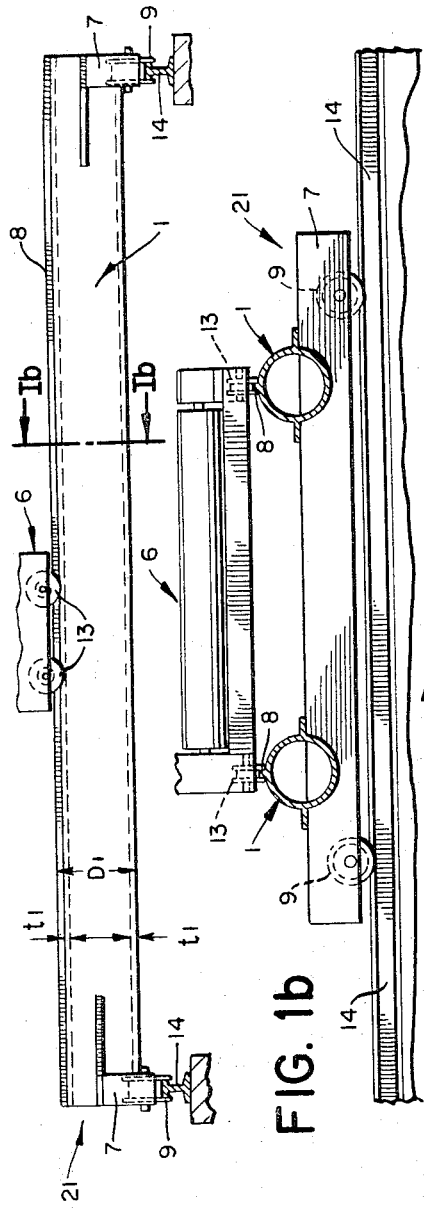
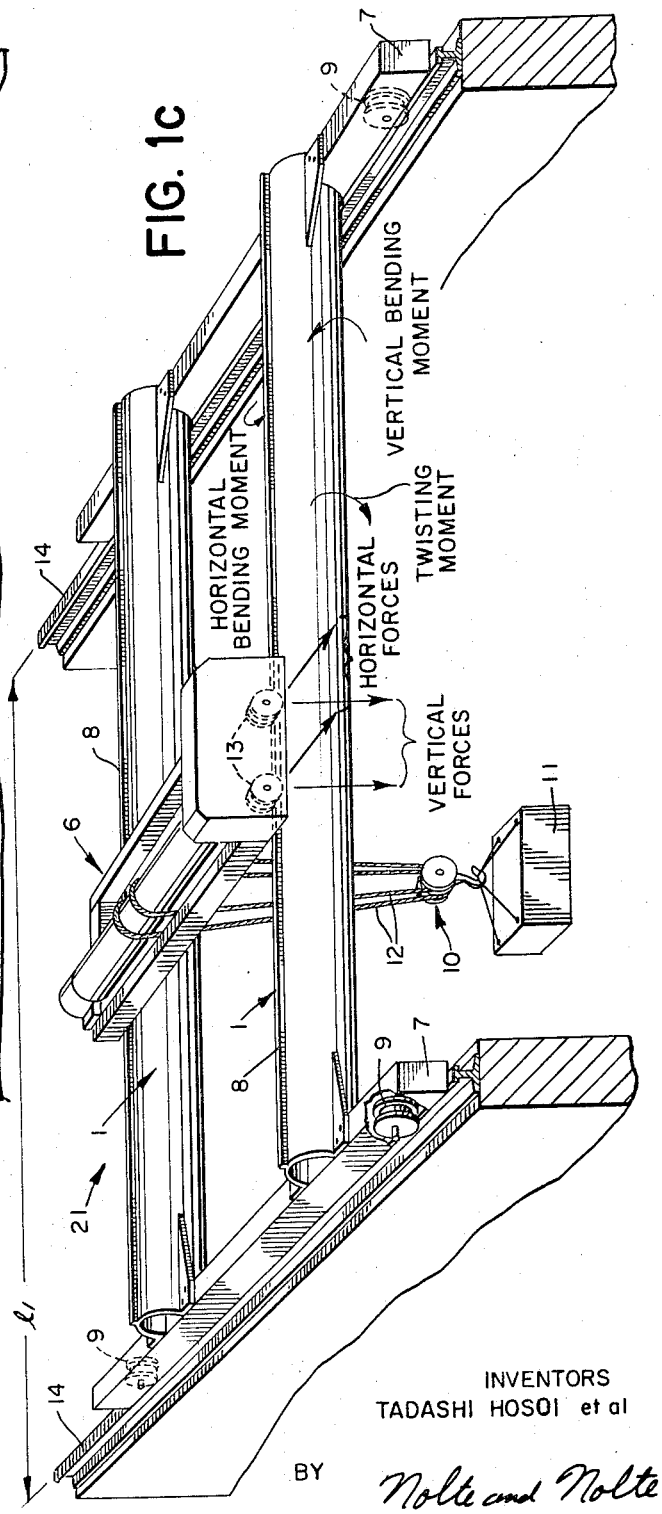

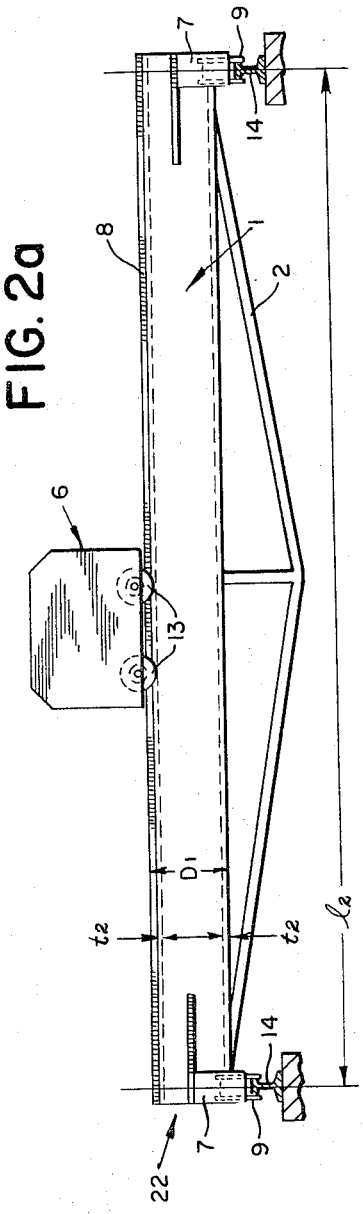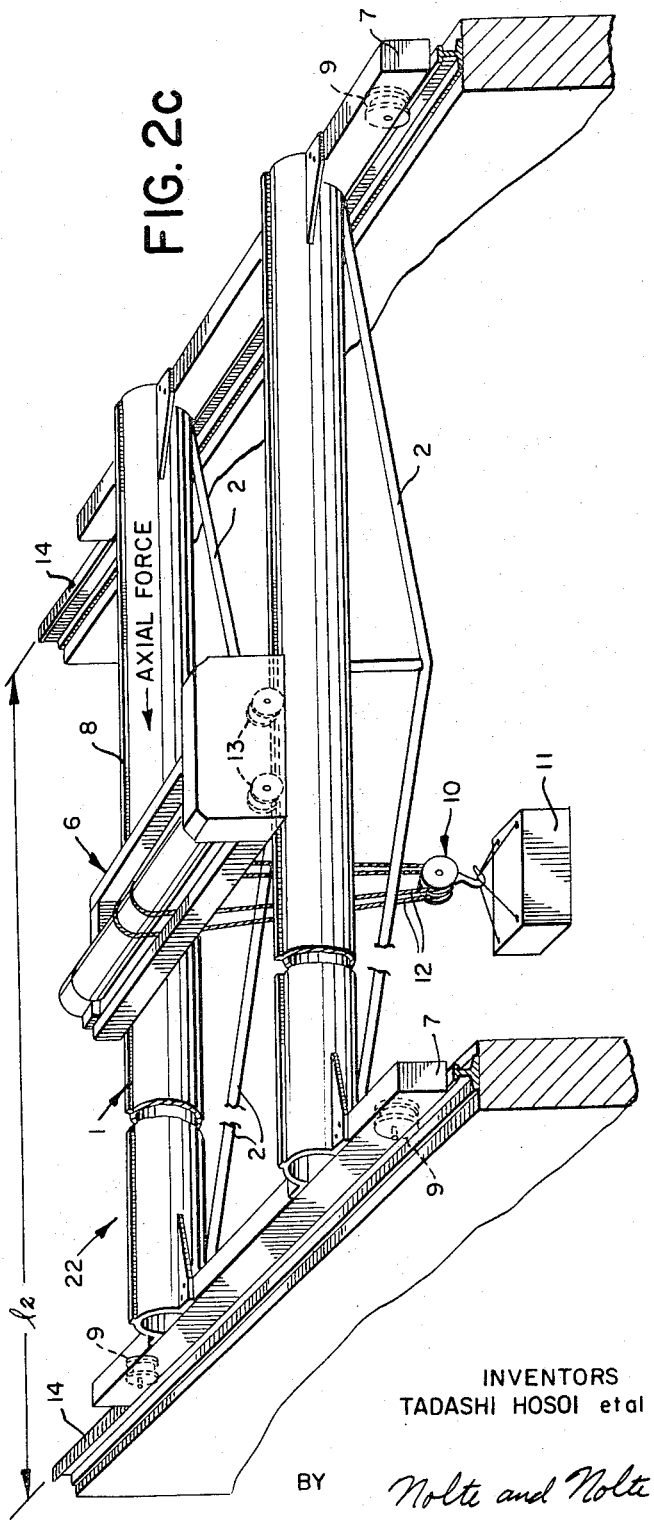

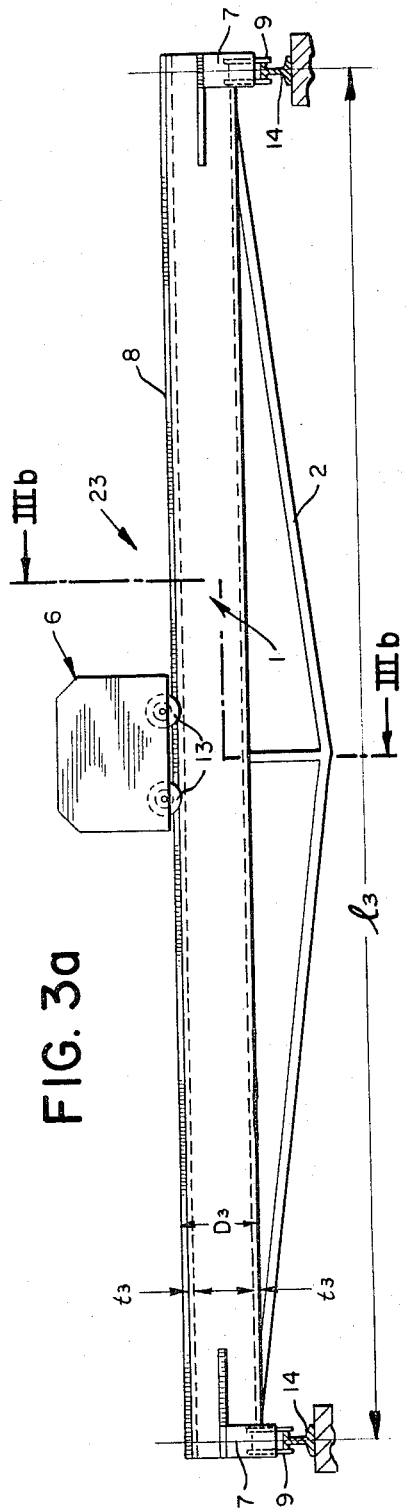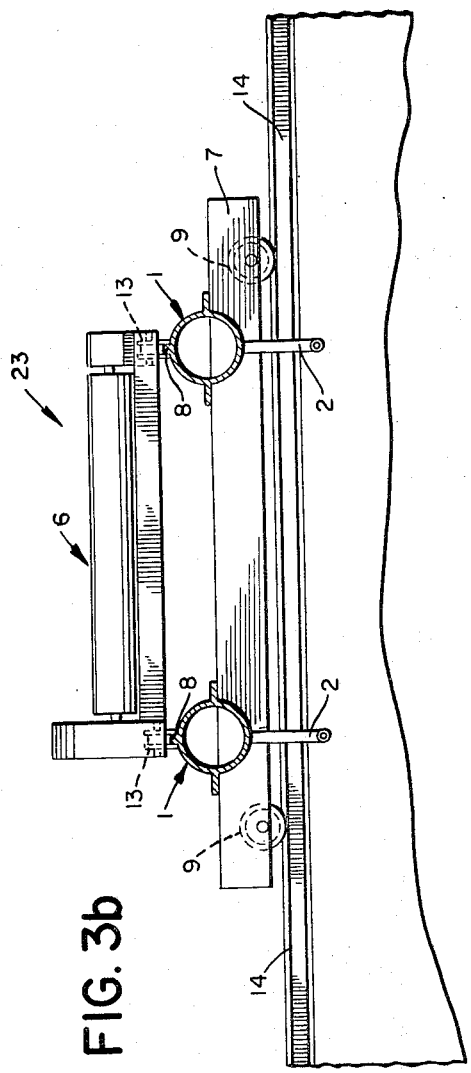

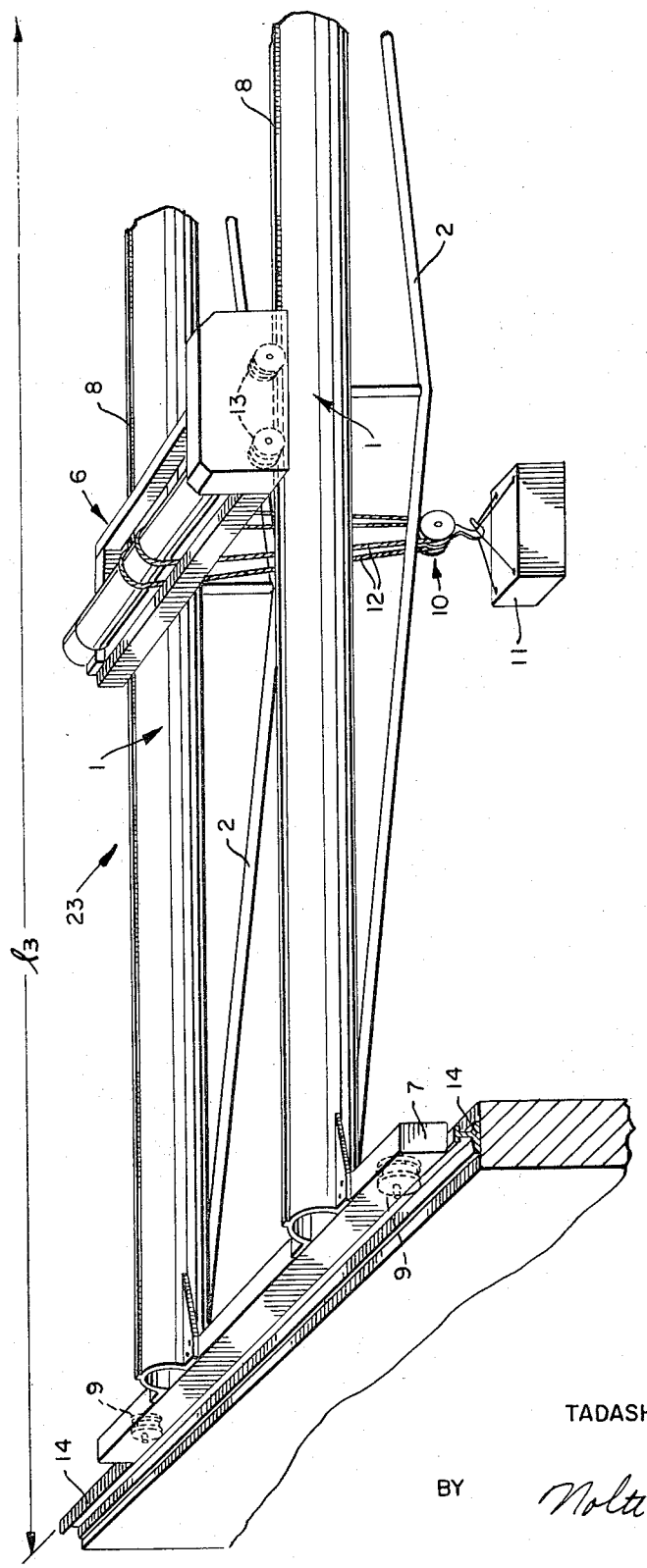

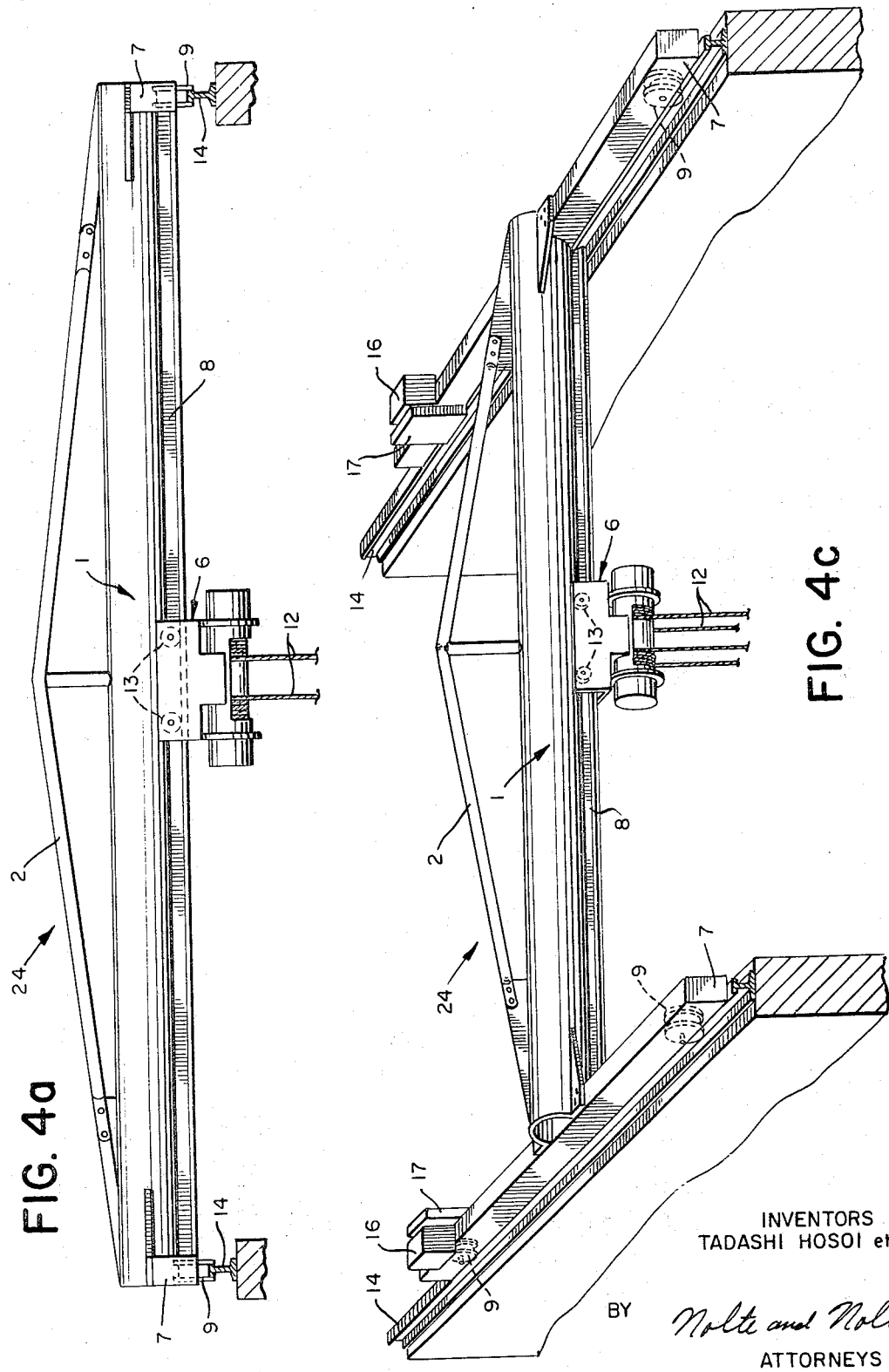

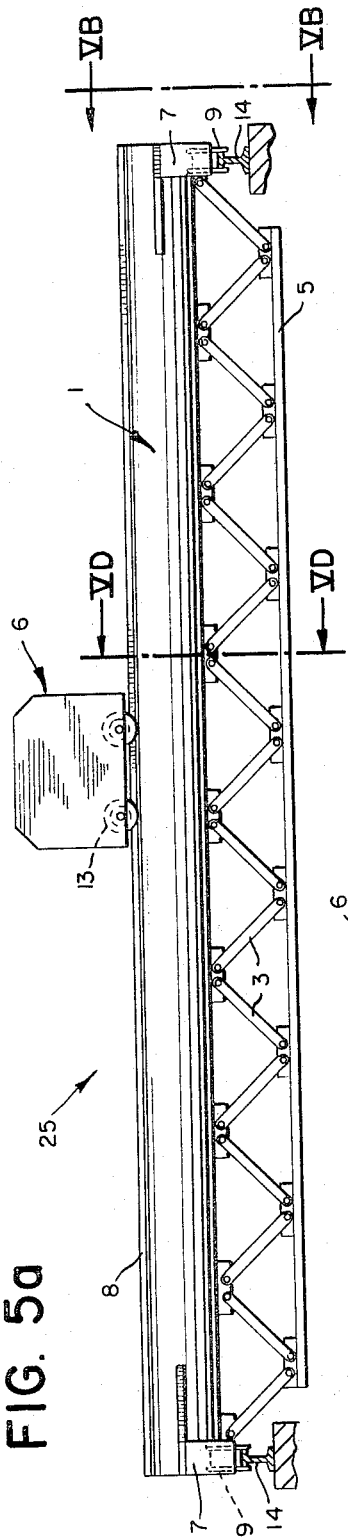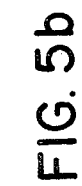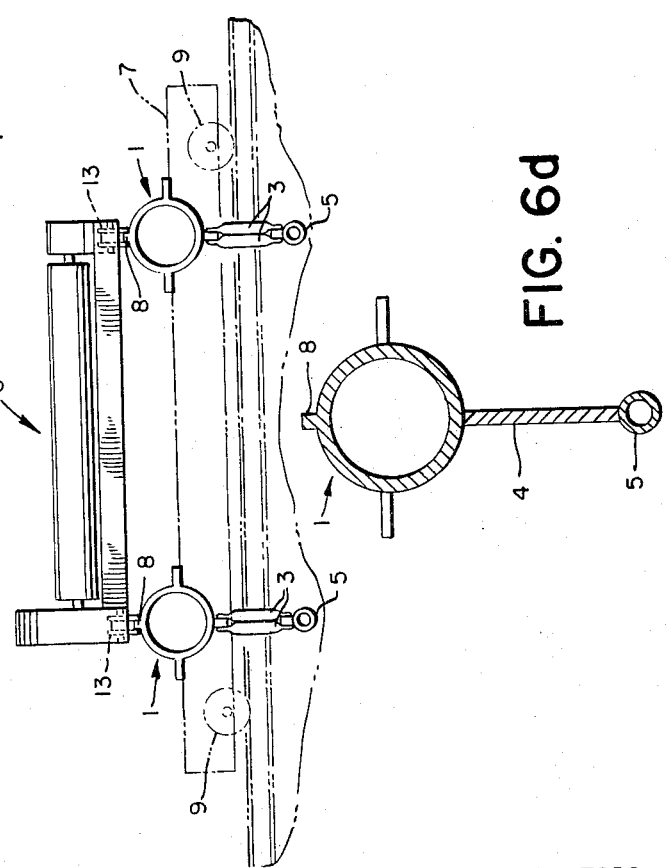

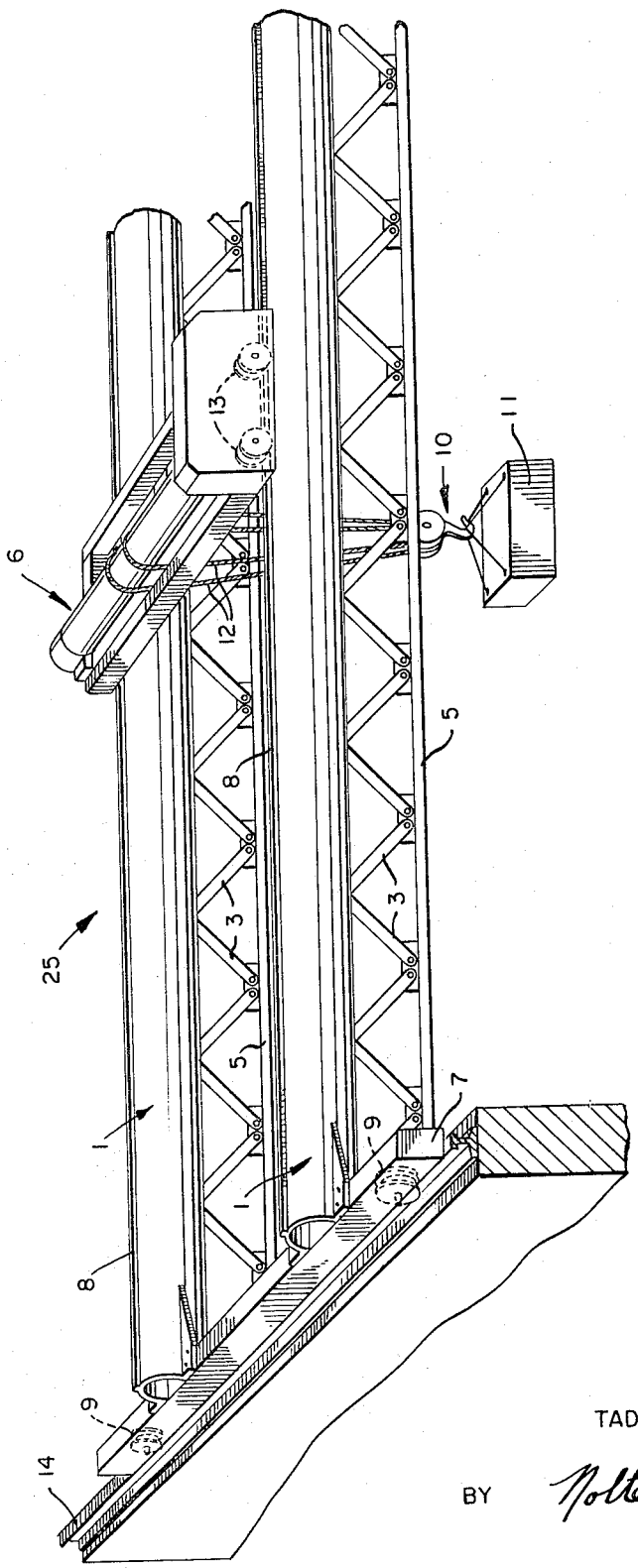

INVENTORS
TADASHI HOSOI et al

BY Nolte and Nolte
ATTORNEYS

Dec. 27, 1966  TADASHI HOSOI ET AL  3,294,252
CRANE GIRDERS
Filed Dec. 3, 1963  10 Sheets-Sheet 10

INVENTORS
TADASHI HOSOI et al

BY  *Nolte and Nolte*
ATTORNEYS

United States Patent Office 3,294,252
Patented Dec. 27, 1966

3,294,252
CRANE GIRDERS
Tadashi Hosoi, Hoya-machi, Kitatama-gun, Tokyo-to, Kazuhide Kobayashi, Meguro-ku, Tokyo-to, and Akira Kato, Omiya-shi, Saitama-ken, Japan, assignors to Ishikawajima-Harima Jukogyo Kabushiki Kaisha, Chiyoda-ku, Tokyo-to, Japan, a company of Japan
Filed Dec. 3, 1963, Ser. No. 327,740
Claims priority, application Japan, Dec. 6, 1962, 37/54,800, 37/54,801, 37/54,802
6 Claims. (Cl. 212—10)

The present invention relates to crane girders and more particularly to a novel traveling crane-girder structure the weight of which is substantially decreased. The expense of the materials is reduced, owing to a much simpler structure than was hitherto known; also, the novel crane girders are much easier and faster to manufacture.

For girders of overhead traveling cranes, various structural solutions have been used so far, like warren girders, plate girders built with steel plates, angular or channel-shaped steel members, pipes, etc., and box girders, the latter being mainly constructed from steel plates. Except in the very last case, supplementary beams are necessary since the lateral bending moment acts on the same main beam together with the vertical and horizontal torsion moments, while the crane is in operation.

As, in the case of warren girders, the slender ratio of the intermediate bracing increases, and simultaneously the allowable compressive load decreases, the girder weight cannot be decreased infinitely and, therefore, the weight and consequently the manufacturing expenses of these girders tend to increase. In the case of plate or box girders, the above conditions are coupled with a decrease of the allowable buckling stress of the web.

It is an object of the present invention to provide traveling crane girders that can be made from less material than conventional girders, while presenting higher resistance to the encountered stresses.

According to one of the major features of the invention, the inventive crane girder has a fully expanded circumference formed by a shell-type cylinder or by curved plates so as to have the encountered forces absorbed by the shell constituting the girder.

According to another important feature, the cross-section may be circular, oval, or any other shape devoid of angles or corners. Rounded-off oblongs, isosceles trapezoids and the like cross-sections are within the scope of the invention.

According to yet another feature, a supplementary member may be provided in addition to the shell-type girder, if used as a main chord, said member being adapted to absorb at least part of the vertical bending force and/or the vertical shearing force. Preferably said supplementary member is provided vertically with respect to the shell.

The invention presents the following major advantages: the weight of the novel crane girders is considerably decreased and their structure is most simple on account of the cylindrical, oval or similar curved surfaces of the shells. Substantial savings can be made in material, assemblage and even storage, since fewer girder types have to be made, stored and handled.

If a structure is adopted in which a supplementary chord is used without a shearing member in the vertical direction of the main chord, the quantity of deflection can be regulated by fixing freely the girder height, determined by the main and the supplementary chords, even with large spans. The weight of the novel girders is not increased; there is no need to consider buckling as in conventional structures.

In girders having a shearing member therein that can absorb part of the vertical shearing forces in the vertical direction of the main chord, various forces other than the vertical shearing force of the horizontal direction can be absorbed by the main chord. The latter may comprise an inventive, e.g. cylindrical, shell with a thin wall, even for large shearing forces.

Figure 10:
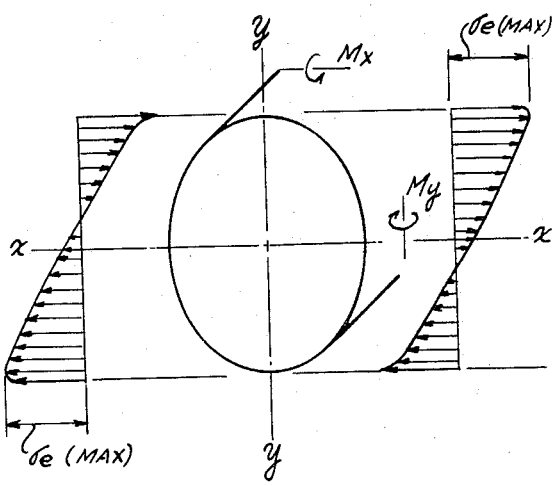
Figure 11:
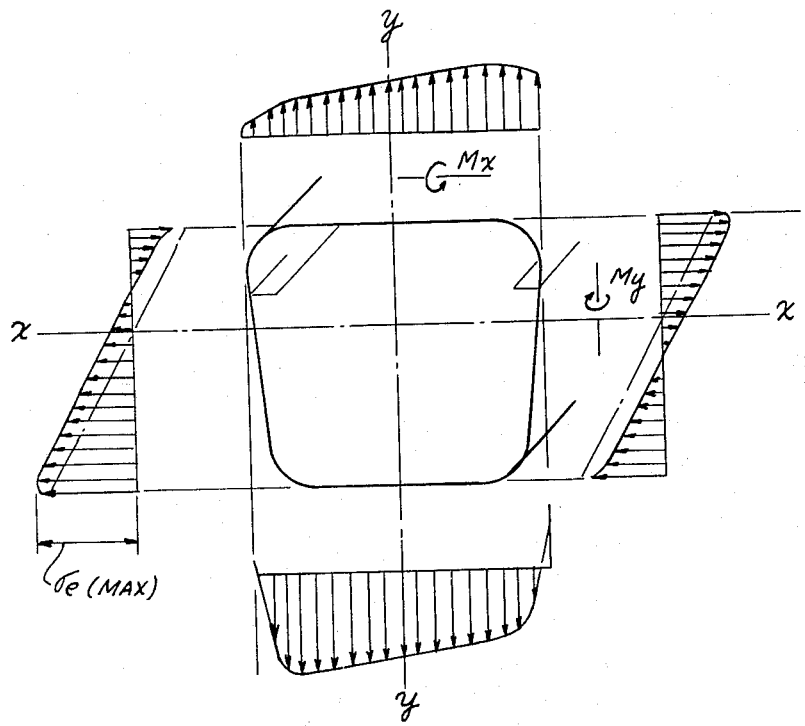
Figure 12:
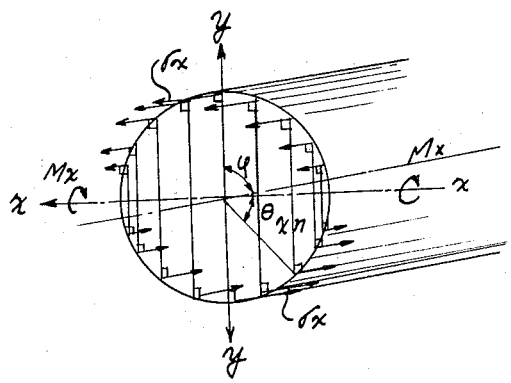
Figure 14:
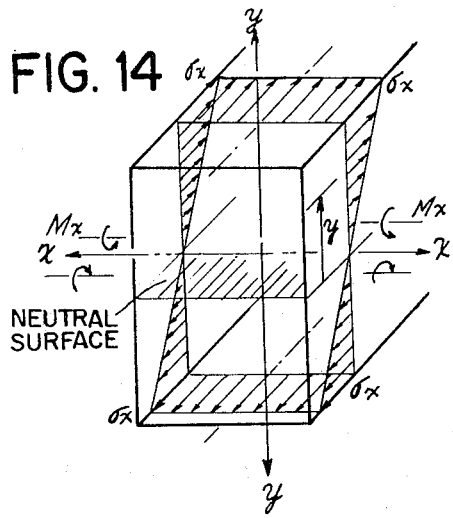
Figure 15:
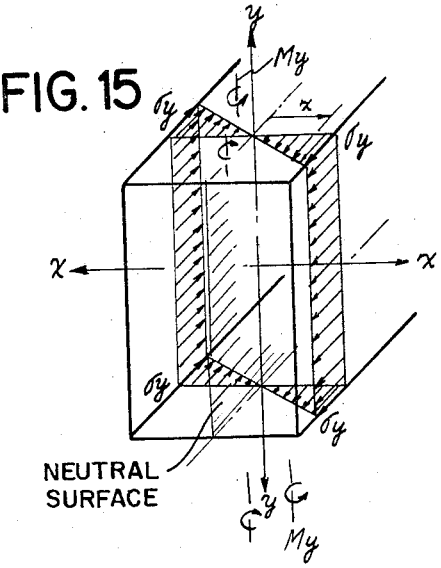
Figure 16:
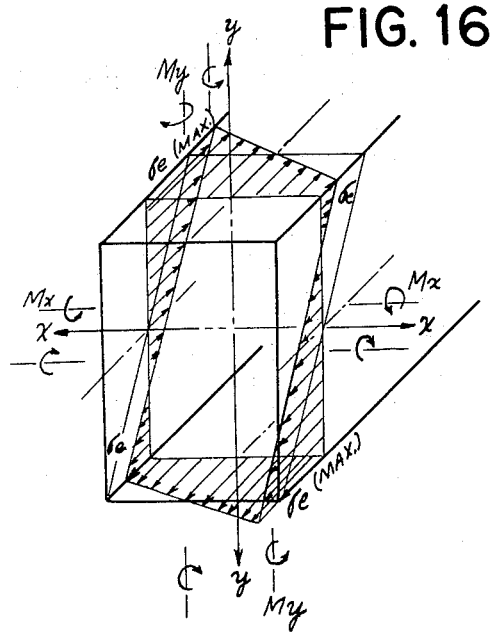

Other objects and many of the attendant advantages of the invention will be readily appreciated as the same becomes better understood by reference to the following detailed description, when considered with the accompanying drawings, wherein:

FIG. 1a shows one embodiment on the inventive traveling crane girder in a somewhat schematic side elevation;
FIG. 1b is a section view taken along line IB—IB of FIG. 1a;
FIG. 1c is a perspective view of the exemplary crane embodiment shown in FIGS. 1a and 1b;
FIG. 2a is an alternative crane girder embodiment with a reinforcing chord, in a view similar to that of FIG. 1a;
FIG. 2c is a perspective view of the crane shown in FIG. 2a, otherwise similar to the view of FIG. 1c;
FIG. 3a is a girder similar to that of FIG. 2a but having different proportions;
FIG. 3b is a sectional view taken along IIIB—IIIB of FIG. 3a, otherwise similar to the view of FIG. 1b;
FIG. 3c is a perspective view of the embodiment shown in FIGS. 3a and 3b;
FIG. 4a is still another embodiment of the inventive crane girder, having an upwardly directed reinforcing chord, shown again in side elevation;
FIG. 4c is a perspective view of the embodiment of FIG. 4a;
FIG. 5a is a side elevation of yet another crane girder having a lattice structure;
FIG. 5b is an end elevation taken along line VB—VB of FIG. 5a;
FIG. 5c is a perspective view of the embodiment shown in FIGS. 5a, 5b and 5d;
FIG. 5d is a sectional view taken along line VD—VD of FIG. 5a;
FIG. 6d is a section similar to that of FIG. 5d but taken from a crane girder which has a solid plate instead of a lattice structure;
FIGS. 7–11 show in a graphical form various states of stress in crane girders, and more particularly: FIG. 7 that in an inventive cylindrical shell, FIG. 8 that encountered in conventional girders having box sections, FIGS. 9 and 10 stress conditions appearing in other inventive crane-girder shapes, and FIG. 11 the state of stress in another shape, according to the invention, having lateral reinforcing flanges against buckling; and
FIGS. 12–16 are explanatory illustrations of the encountered stress conditions, wherein FIGS. 12 and 13 relate to cylindrical shell-type girders and FIGS. 14–16 to box girders (in accordance with respective FIGS. 7 and 8), and more particularly: FIGS. 12 and 14 relate to the application of vertical bending moments, FIGS. 13 and 15 to lateral bending moments, and finally FIG. 16 illustrates maximum resultant bending stress on effect of both vertical and lateral (horizontal) forces.

In the first exemplary embodiment, illustrated in FIGS. 1a, 1b and 1c, a traveling crane is generally designated 21 and is provided with bridge shells 1 having a fully expanded cylindrical circumference. Each shell has a rail 8 for movement of a crane trolley 6 therealong. The shells 1 are secured in the illustrated manner to lateral saddles 7 which, in turn, are movable along rails or runways 14 by the intermediary of rollers or wheels 9. This crane-girder embodiment does not have any reinforcing chords.

In a manner known per se, trolley 6 carries a hoisting block or pulley schematically shown at 10, suspended by means of cables 12 and adapted to carry a load 11. Rollers or wheels 13 allow movement of trolley 6 along the bridge structure.

In the alternative crane embodiment 22 illustrated in FIGS. 2a and 2c, a lower reinforcing chord 2 is used for each shell 1. Parts of the bridge structure have been broken away and the sectional view given for the first embodiment has been omitted. The shells have the same fully expanded circumference as disclosed for crane 21.

FIGS. 3a, 3b and 3c relate to a third variant, designated 23, and having proportions different from crane 22. Further details will be given hereunder when discussing the forces and moments acting on the crane girders.

FIGS. 4a and 4c relate to still another crane embodiment 24, having an upper reinforcing chord 2 for the single shell 1. This crane has a suspended trolley 6 reciprocable with its rollers 13 along a bottom rail 8 of said bridge shell 1. As a matter of example, the crane 24 has been shown with drive means 16 in the region of one of the rollers 9 and with guard means 17 for a chain or gear drive (not shown in detail) between 16 and 9. These and/or similar means known per se may, of course, be used in connection with any or all of the described and illustrated crane embodiments 21–25 of the present application.

Yet another crane structure, designated 25, is illustrated in FIGS. 5a, 5b, and 5d. Instead of the reinforcing chords used in some of the previous variants, this structure is provided with vertical lattice members 3 connected to a lower chord 5 which may be tubular, as best shown in FIG. 5d, or of any other shape. In the latter figure the top rail 8 has been omitted for the sake of clarity. In FIG. 5c, parts of the crane girder structure are broken away owing to space limitations.

FIG. 6d is an illustration similar to that of FIG. 5d, relating to still another crane structure (not shown in detail) wherein a tubular lower chord 5 is used in conjunction with a plate-shaped member 4 substituting the individual lattice members 3 of the previous embodiment. Otherwise the non-illustrated sixth crane structure might be identical with the previously shown fifth variant.

In all the crane girders, the shell 1 is used as a main chord. The following important considerations apply:

(I) The shell has a fully expanded circumference by using a cylinder or, alternately, curved plates so that the allowable buckling stress will be remarkably high. Accordingly, the shells can be made larger by using thinner material, whereby higher rigidity values are being obtained as compared to the weight of the used material. The inventive shell-type crane girders will thus withstand higher values of vertical, axial, shearing, twisting and other forces which act thereon from various directions.

(a) The crane structure 21 consists of the shell 1 proper and may be used for short spans in which there is no need for auxiliary beams or members to withstand shearing forces, as in conventional type crane girders.

(b) In case of longer spans, as shown in the embodiments 22–25, the various shells 1 can be made of relatively thin material which will be capable of absorbing all the aforementioned forces that act in a crane, if bending rigidity is increased by the provision of reinforcement chords 2, without intermediate shearing members (see cranes 22–24). In cases where a particularly high shearing force is encountered or expected, the forces can be absorbed by providing members 3 or 4 (see respective crane embodiment 25 as well as FIG. 6d) along the vertical direction of the main chord consisting, again, of a thin-walled shell or shells. There is, therefore, no need to provide a supplementary beam as in the case of conventional girders.

(II) While the crane is traveling, vertical and horizontal forces act on the girder. Since no supplementary beams are required, the twisting centers are located right under the vertical forces (see FIG. 1c) and thus no torsional force acts on the girder on effect of the vertical forces.

Figure 13:
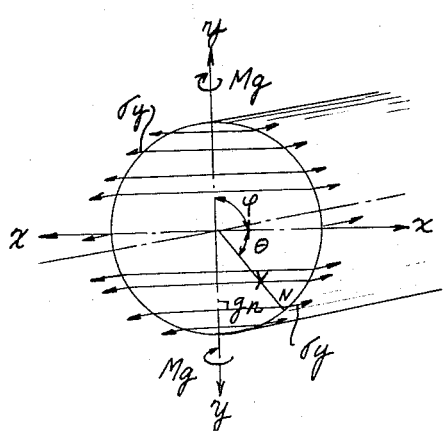

For a better understanding of the maximum resultant stress conditions encountered when vertical and lateral bending moments act simultaneously against *cylindrical shell girders of the inventive type*, as compared to box girders, the following considerations are presented:

(a) FIG. 7 shows the state of the stress action upon any of the shells 1 used in the inventive cranes 21–25, while FIGS. 12 and 13 relate to the vertical and lateral bending moments acting with regard to the x and y axes, respectively.

In case of a vertical bending moment $M_x$ resulting owing to vertical forces (see FIG. 12), fiber stress=bending stress, giving a couple of internal resistance within the girder section, relatively to the axis $x$ which will thus be balanced with $M_x$. Similarly, when lateral bending moment $M_y$ occurs on account of lateral forces (see FIG. 13), fiber stress is again noticeable in the girder section, in a direction similar to that of $M_x$, which then will be balanced with $M_y$ relative to the $y$ axis.

Thus, it follows that resultant stress at any given point of the section can be expressed as vector sum of fiber stress measured at the same point; therefore, it is very simple to compound vectors. Further, an expression of maximum resultant stress will be established on the general compounding principle, say, $\sigma_e(\max.)=\sqrt{\sigma_x^2+\sigma_y^2}$.

Reference should be had in the following to the aforementioned FIGS. 12 and 13 wherein the respective stress conditions are graphically illustrated.

$$\text{Induction of } \sigma_e(\max.)=\sqrt{\sigma_x^2+\sigma_y^2}$$

In the FIGS. 12 and 13, certain conventional symbols have been used, as follows:

$M_x$: vertical bending moment
$M_y$: lateral bending moment
$\gamma$: radius of cylinder
$X_n$: distance between axis X and N, an arbitrary point
$Y_n$: distance between axis y and N, an arbitrary point
$\varphi$: angle at which axises $x$ and $y$ cross each other
$\theta$: angle of N against the axis $x$
$I:I_x:I_y$: moment of inertia of the cylindrical shell Resultant fiber stress at N thereat will be expressed by the following:

$$\sigma_e = \frac{M_x}{I_x}X_n + \frac{M_y}{I_y}Y_n \tag{1}$$

$$\because X_n = \gamma \cdot \sin \theta, Y_n = \gamma \cdot \sin (\varphi+\theta)$$

And $I_x=I_y$ can be established because it is a case of cylinder. If it is expressed by one mark "I," then the Expression 1 will be as follows:

$$\sigma_e = \frac{M_x}{I}\cdot\gamma\cdot\sin\theta + \frac{M_y}{I}\cdot\gamma\cdot\sin(\varphi+\theta) \tag{2}$$

Generally, in case of a crane girder, the angle made between vertical bending moment and lateral bending moment is accepted as $\varphi=\pi/2$. Therefore, the Expression 2 can be turned as under:

$$\sigma_e = \frac{M_x}{I}\cdot\gamma\cdot\sin\theta + \frac{M_y}{I}\cdot\gamma\cdot\sin(\pi/2+\theta)$$

$$= \frac{M_x}{I}\cdot\gamma\cdot\sin\theta + \frac{M_y}{I}\cdot\gamma\cdot\cos\theta \tag{3}$$

In regard to the maximum resultant stress, the value of $\theta$ and that of $\sigma_e$ can be respectively obtained by setting as 0 (zero) the value gained through differenciation of $\sigma_e$ by $\theta$ in the Expression 3, say, $$\frac{d\sigma_e}{d\theta} = \left(\frac{M_x}{I}\cdot\gamma\cdot\sin\theta + \frac{M_y}{I}\cdot\gamma\cdot\cos\theta\right)d\theta$$

$$= \frac{M_x}{I}\cdot\gamma\cdot\cos\theta - \frac{M_y}{I}\cdot\gamma\cdot\sin\theta \tag{4}$$

Where, $$\frac{d\sigma_e}{d\theta}=0 \quad \frac{M_x}{I}\cdot\gamma\cdot\cos\theta-\frac{M_y}{I}\cdot\gamma\cdot\sin\theta=0 \quad (5)$$

The Expression 5 can be rearranged as follows:

$$\frac{M_x}{I}\cdot\gamma\cdot\cos\theta=\frac{M_y}{I}\cdot\gamma\cdot\sin\theta$$

$$\frac{\cos\theta}{\sin\theta}=\cot\theta=\frac{M_y}{M_x} \quad (6)$$

Further, the Expression 6 can be expressed geometrically as under:

$$\cos\theta=\frac{M_x}{\sqrt{M_x^2+M_y^2}}=\frac{1}{\sqrt{\left(\frac{M_x}{M_y}\right)^2+1}} \quad (7)$$

$$\sin\theta=\frac{M_x}{\sqrt{M_x^2+M_y^2}}=\frac{\left(\frac{M_x}{M_y}\right)}{\sqrt{\left(\frac{M_x}{M_y}\right)^2+1}} \quad (8)$$

Thus, the right location for maximum resultant stress has been decided by the Expressions 7 and 8. By application of its to the Expression 3, next will be gained:

$$\sigma_e(\max.)=\frac{M_x}{I}\cdot\gamma\cdot\sin\theta+\frac{M_x}{I}\cdot\gamma\cdot\cos\theta$$

$$=\frac{M_x}{I}\cdot\gamma\cdot\frac{\left(\frac{M_x}{M_y}\right)}{\sqrt{\left(\frac{M_x}{M_y}\right)^2+1}}+\frac{M_y}{I}\cdot\gamma\cdot\frac{1}{\sqrt{\left(\frac{M_x}{M_y}\right)^2+1}}$$

$$=\frac{M_x\cdot\gamma\cdot\frac{M_x}{M_y}+M_y\cdot\gamma}{I\sqrt{\left(\frac{M_x}{M_y}\right)^2+1}}=\frac{\gamma}{I}\frac{\left(\frac{M_x^2}{M_y}+M_y\right)}{\sqrt{\left(\frac{M_x}{M_y}\right)^2+1}}$$

$$=\frac{\gamma}{I}\cdot\frac{\frac{M_x^2+M_y^2}{M_y}}{\sqrt{\left(\frac{M_x}{M_y}\right)^2+1}}=\frac{\gamma}{I}\frac{M_x^2+M_y^2}{\sqrt{M_x^2+M_y^2}}$$

$$=\frac{\gamma}{I}\sqrt{M_x^2+M_y^2}\sqrt{\left(\frac{M_x\gamma}{I}\right)^2+\left(\frac{M_y\gamma}{I}\right)^2} \quad (9)$$

$$\therefore \sigma_x=\frac{M_x}{I}\gamma \quad (10)$$

$$\sigma_y=\frac{M_y}{I}\gamma \quad (11)$$

By application of 10 and 11 to the Expression 9, the final expression can be gained, say, $$\sigma_e(\max.)=\sqrt{\sigma_x^2+\sigma_y^2}$$

Figure 8:
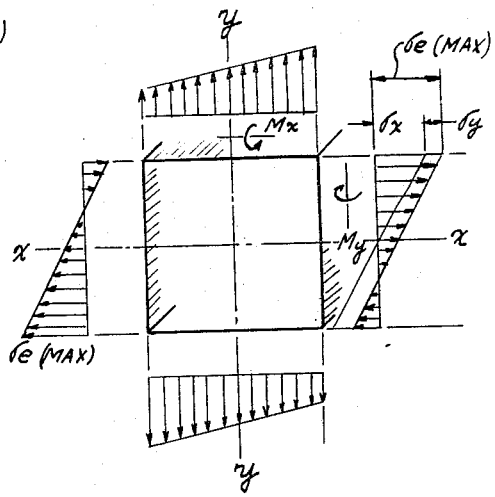

(b) FIG. 8 shows, in a manner readily comparable to FIG. 7, the state of the stress acting upon *conventional box girders* over which the present invention represents a major improvement. FIGS. 14–16 relate, respectively, to the vertical, lateral and composite bending moments acting with regard to the *x* and *y* axes, as well as to both. In FIGS. 14 and 15, the neutral surfaces are clearly labeled.

In case of a vertical bending moment $M_x$ resulting owing to vertical forces (see FIG. 14), fiber stress=bending stress, giving a couple of internal resistance within the girder section, relatively to the axis *x* which will thus be balanced with $M_x$. Similarly, when lateral bending moment $M_y$ occurs on account of lateral forces (see FIG. 15), fiber stress is again noticeable in the girder section, in a direction similar to that of $M_x$, which then will be balanced with $M_y$ relative to the *y* axis.

Therefore, resultant stress at any arbitrary point in the section is proved to be the vector sum of the fiber stress thereat.

As a result, maximum resultant bending stress will be produced at each corner under the conditions illustrated in FIG. 16. With reference to $M_x$, FIGS. 14–16 clearly illustrate how the fiber stress becomes maximum at the corner of the box-type girders.

The following explanation should be added in this regard: The stress accompanying the fiber strain can be ascertained by Hook's law, as follows:

$$\sigma_x=\frac{E\cdot y}{\gamma}$$

wherein

E: vertical elastic coefficient
γ: radius of bending (re: bent girder)
y: distance between a neutral surface and an arbitrary surface (see FIGS. 14 and 15)

In accordance with the above equation, $\sigma_x$ is in direct proportion to *y* and (as far as the box section is concerned) maximum bending stress results at a corner where *y* is maximum. The same applies with regard to $M_y$: maximum bending stress occurs at a corner. Thus maximum resultant stress, viz., $\sigma_e(\max.)$ is obtained by the simple combination of $\sigma_x$ with $\sigma_y$, to result in $$\sigma_e(\max.)=\sigma_x+\sigma_y$$

(III) With warren or plate girders of the conventional type, it is advantageous to make the depth of the girder greater in order to keep deflection within permissible values. This, however, requires longer intermediate bracings which necessarily increase the slender ratio and decrease the allowable compressive or buckling stress. The size of the intermediate bracing or the thickness of the web plate must accordingly be increased because they are conditioned by buckling. As a result, the size of intermediate bracing, the web thickness and also the manufacturing cost increase considerably.

In contradistinction, the present invention provides the girder itself, or the main chord, in form of a cylindrical shell whose vertical section is that of a curve so that there is no need for a particular member to withstand shearing forces. Even in cases where the span is long, the deflection can be kept under the permissible value by providing a supplementary chord only. Accordingly, deflection can be controlled by determining the distance between the main chord and the supplementary chord, and also by properly dimensioning the height of the girder. Therefore, the weight of the inventive girder does not increase while its load-bearing capacity is far in excess of that achieved with hitherto known conventional structures.

(IV) If shell 1 is used for the main chord, the shell may have the same sectional size for various spans and only some supplementary chord (e.g. 2) has to be added, for example, if the shell suitable for the girder has already been manufactured.

With regard to the various embodiments 21–25 of the invention, it should be noted that both the horizontal and the vertical bending moments as well as the twisting moment acting on the shell-type girders have been shown in FIG. 1c, in addition to the horizontal and vertical forces that apply to the trolley when the crane is in operation (e.g., when the bridge moves along the lateral rails with a load suspended on the trolley). The axial forces are additionally indicated in FIG. 2c.

Up to a span $l_1$ (crane girder embodiment 21 in FIGS. 1a–1c), in which the bending rigidity from the vertical direction is effective, the girder may be formed by the shell 1 alone. Span $l_2$ (pertaining to the variant 22 in FIGS. 2a and 2c) is characteristic of the condition in which bending rigidity in vertical direction begins to be insufficient. Span $l_3$, finally (shown for crane embodiment 23 in FIGS. 3a–3c), represents the condition in which the rigidity of the horizontal direction reaches its effective limit.

Between span values $l_2$ and $l_3$, merely a supplemental chord 2 has to be added, as illustrated for variants 22 and 23. In such a case the vertical section of the shell 1 may be one in which the ratio between the thickness of material $t_1$, $t_2$, $t_3$, and the diameter of the shell $D_1$, $D_2$, $D_3$ is $t_1=t_2=t_3=D_1=D_2=D_3$. These designations appear in FIGS. 1a–3a and 1c–3c.

Although not specifically identified in the drawings, the variant 24 of FIGS. 4a and 4c may be considered the equivalent of variant 23 which has a length indication of $l_3$.

For proportions and lengths equal to, or greater than, those shown at $l_1$–$l_3$, it is recommended to use the lattice structure shown in FIGS. 5a–5d or 6d.

Accordingly, it becomes possible to decrease material expenses by standardizing the material used for girders suitable for various spans, and also to stock a relatively large number of shells for promptly meeting various requirements. The present invention thus allows to prepare and install crane girders without loss of time, and with a substantial reduction in planning, assembling and erecting work.

Figure 9:
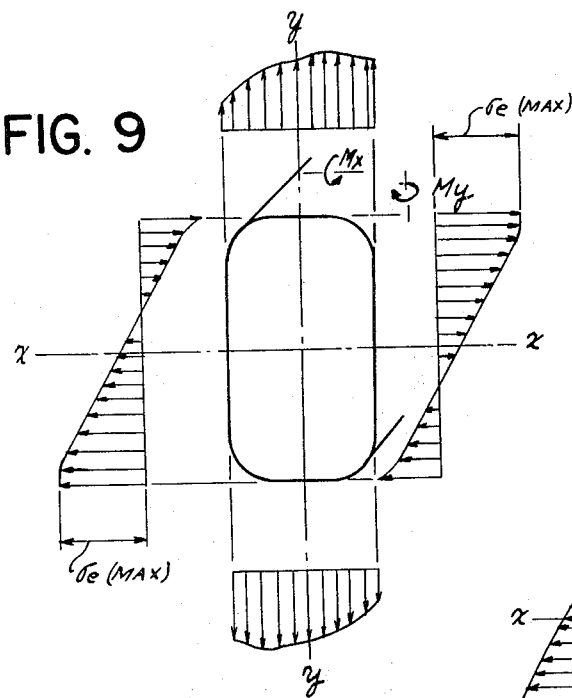

The embodiments 21–25 are all shown with circular vertical sections of the respective shells 1 (see FIGS. 1b, 3b and 5b). It will be appreciated, however, by those skilled in the art that the circular cross-section may be varied and transformed, e.g. as shown in FIGS. 9–11, representing an oblong such as ellipse or quadrilateral shape with rounded-off corners, an oval, and an isosceles trapezoid with similarly rounded corners, respectively. Any cross-section may be formed as long as it is the combination of curved surfaces alone so that the vertical section of the shells present no angles at all. Although not analyzed in detail, it will be understood that the graphical presentation of FIGS. 9–11 is co-ordinated with those of FIGS. 7 and 8, discussed hereinabove in detail. In FIG. 11, the lateral, inwardly bent flanges are means for reinforcing the shell against possible buckling.

The lower chord member 5, shown for example in FIGS. 5d and 6d with a circular cross-section, may be of any optional type if combined with the inventive crane girders.

The foregoing disclosure relates only to preferred embodiments of the invention which are intended to include all changes and modifications of the examples described within the scope of the invention as set forth in the appended claims.

We claim:
1. In travelling crane apparatus wherein girder means are provided to support a trolley,
 lateral runway means for supporting said girder means therebetween,
 said girder means including at least one primary chord member for absorbing vertical forces applied to said girder means during operation of the crane, said chord member extending athwart said lateral runway means and having a fully expanded hollow shell structure which has a continuously curved cross section devoid of angles,
 track means secured to each said chord member, to form an integral part therewith and extending substantially parallel to the longitudinal axis of said girder means,
 and a trolley reciprocably movable along a substantial portion of said track means.

2. Apparatus according to claim 1 wherein said cross section is circular.

3. Apparatus according to claim 1 wherein said cross section is oval.

4. In travelling crane apparatus wherein girder means are provided to support a trolley,
 lateral runway means for supporting said girder means therebetween, said girder means including at least one main chord member for absorbing vertical forces applied to said girder means during operation of the crane, said chord member extending athwart said lateral runway means and having a fully expandable hollow shell structure which has a continuously curved cross section devoid of angles,
 reinforcing means for absorbing a minor portion of vertical forces applied to said girder means, said reinforcing means being secured to a portion of each said chord member,
 track means secured to each said chord member to form an integral part therewith and extending substantially parallel to the longitudinal axis of said girder means,
 and a trolley reciprocably movable along a substantial portion of said track means.

5. Apparatus according to claim 4 wherein said reinforcing means comprise a lower chord member.

6. Apparatus according to claim 4 wherein said reinforcing means comprise an upper chord member.

References Cited by the Applicant

UNITED STATES PATENTS

| | | | |
|---|---|---|---|
| 431,203 | 7/1890 | Dithridge | 189—37 |
| 1,431,521 | 10/1922 | Hall | 189—37 X |
| 1,523,106 | 1/1925 | Dornier | 52—693 X |
| 1,705,798 | 3/1929 | Beisel | 189—37 |
| 3,067,844 | 12/1962 | Hunnebeck | 189—37 |
| 3,129,493 | 4/1964 | Grubb | 189—37 X |

FOREIGN PATENTS 857,139 11/1952 Germany.

REINALDO P. MACHADO, *Primary Examiner.*

RICHARD W. COOKE, JR., HARRISON R. MOSELEY, *Examiners.*

L. R. RADANOVIC, A. I. BREIER, *Assistant Examiners*